Dec. 21, 1937.     A. J. VAN ENKEVOORT     2,103,127
FLOWERPOT HOLDER
Filed March 23, 1937     2 Sheets-Sheet 1
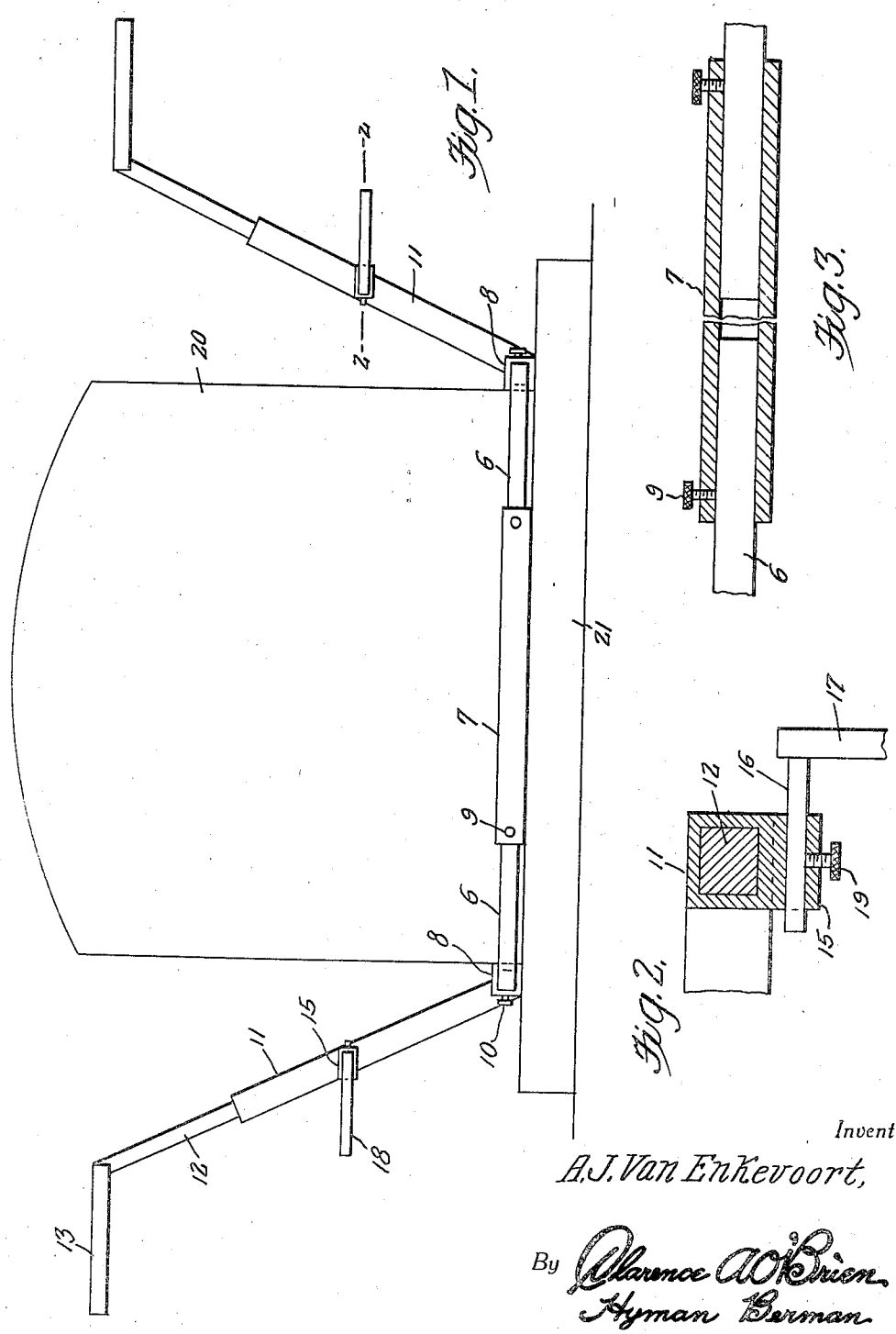
Inventor
A. J. Van Enkevoort,
By Clarence A. O'Brien
Hyman Berman
Attorneys

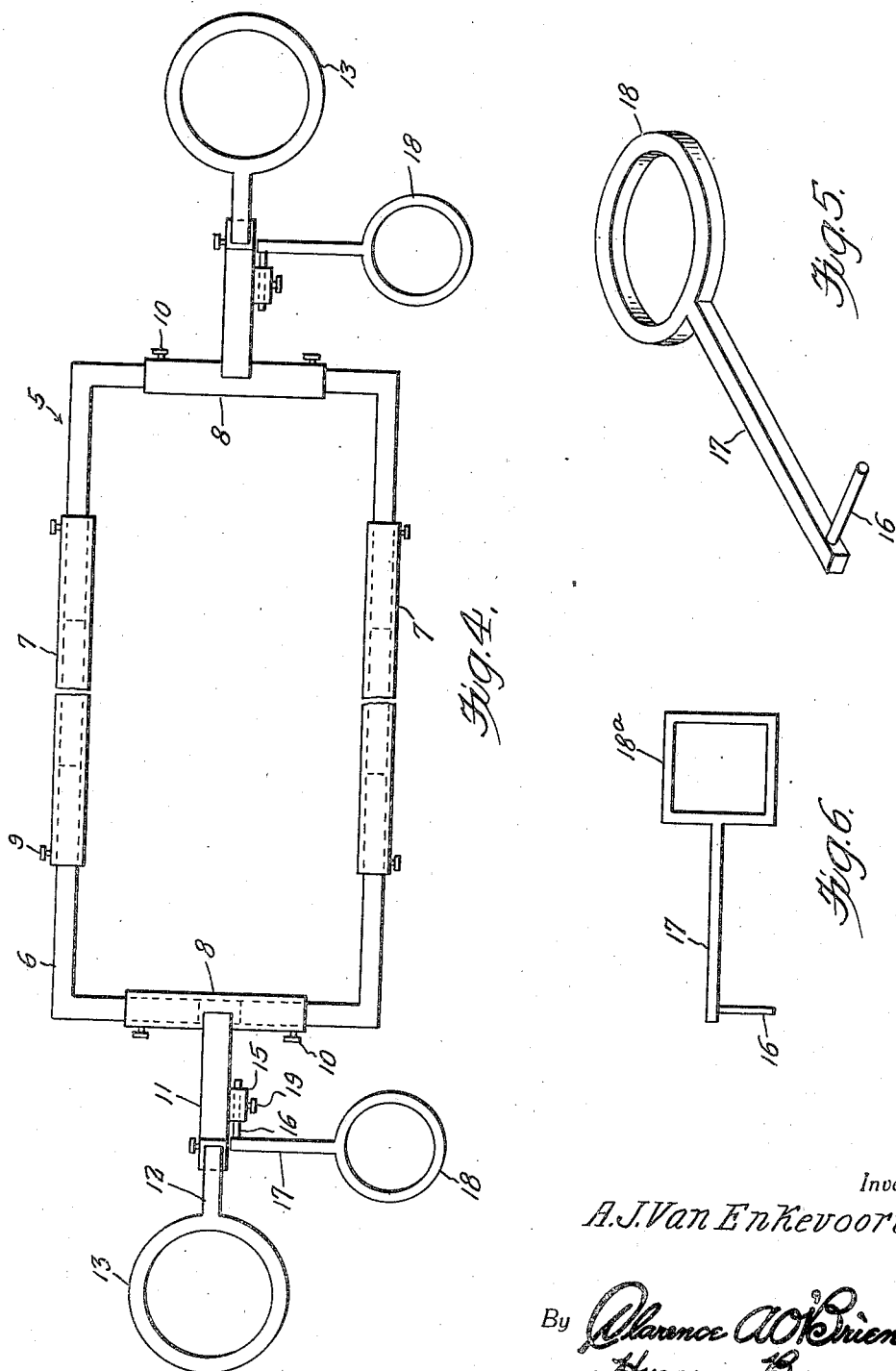

Patented Dec. 21, 1937

2,103,127

UNITED STATES PATENT OFFICE 2,103,127

FLOWERPOT HOLDER

Albert J. Van Enkevoort, Milwaukee, Wis.

Application March 23, 1937, Serial No. 132,600

1 Claim. (Cl. 211—71)

This invention relates to devices for holding flower pots and an object of the invention is to provide a holder of this character particularly designed for holding flower pots and like plants and/or flower receptacles; and which will be found particularly useful for supporting flowers and/or plants used for grave decorating purposes.

A further object of the invention is to provide a holder of this character having a part adapted to be disposed about the base of a head-stone.

The invention together with its objects and advantages will be best understood from a study of the following description taken in connection with the accompanying drawings wherein:—

Figure 1 is a side elevational view illustrating the application of the invention.

Figure 2 is a detail view taken substantially on the line 2—2 of Figure 1.

Figure 3 is a fragmentary detail view illustrating certain details hereinafter more fully referred to.

Figure 4 is a top plan view of the holder.

Figure 5 is a perspective view of a loop member and

Figure 6 is a top plan view of a slightly modified form of loop member.

Referring to the drawings by reference numerals it will be seen that in the preferred embodiment thereof the improved flower pot holder comprises a longitudinally and transversely extensible frame 5 made up of four substantially L-shaped frame members 6, side coupling sleeves 7 and end coupling sleeves 8.

The coupling sleeves 7 and 8 receive the ends of the members 6 in a manner clearly shown in the drawings and said sleeves 7 and 8 respectively are provided adjacent their respective opposite ends with set screws 9 and 10 respectively that serve to secure the ends of the members 6 within the ends of the respective sleeves 7 and 8 to secure the parts of the frame at the desired longitudinal and transverse adjustment.

The end sleeves 8 have extending upwardly therefrom and at a suitable incline tubular arms or extensions 11 that telescopically receive the shanks 12 of flower pot receiving and supporting loops 13 which latter may be as shown in Figure 5, circular, or as shown in Figure 6 may be substantially square, the square loops being indicated by the reference numeral 18a.

Also, the tubular arms 11 at one side are provided with lateral apertured bosses 15 that receive lateral pins 16 provided on the shank 17 of additional flower pot receiving and supporting loops 18 which loops may be either circular or substantially square. Lugs 15 are provided with set screws 19 that bind on the pins 16 in a manner to secure the pins 16 engaged with the lugs 15.

In actual practice, and as shown in Figure 1, the frame 5 is disposed about the base or lower portion of the head stone 20 and rests on the foot or supporting plate 21 provided for said head stone. The flower pots or other plant receptacles are placed within the supporting rings 13 and 18, and the device thus serves to support the flower pots or plant receptacles in an attractive manner.

Having thus described the invention, what is claimed as new is:—

Means for supporting flowers on a tombstone comprising a frame adapted to rest on the base of the stone, means for adjusting the frame to fit around stones of different types, said means including sleeves for receiving other parts of the frame and means for fastening such other parts in the sleeves, upwardly and outwardly sloping arms connected with some of the sleeves and receptacle supporting members adjustably connected with the arms.

ALBERT J. VAN ENKEVOORT.